(12) United States Patent
Woo et al.

(10) Patent No.: US 12,275,453 B2
(45) Date of Patent: Apr. 15, 2025

(54) FASTENING APPARATUS FOR VEHICLE

(71) Applicant: HYUNDAI MOBIS Co., Ltd., Seoul (KR)

(72) Inventors: Hyun Jin Woo, Yongin-si (KR); Hyoun Young Oh, Yongin-si (KR); Ho Youn Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 362 days.

(21) Appl. No.: 18/083,100

(22) Filed: Dec. 16, 2022

(65) Prior Publication Data
US 2023/0278633 A1    Sep. 7, 2023

(51) Int. Cl.
*F16B 5/02* (2006.01)
*B62D 21/09* (2006.01)
*B62D 27/02* (2006.01)

(52) U.S. Cl.
CPC .......... *B62D 21/09* (2013.01); *B62D 27/023* (2013.01)

(58) Field of Classification Search
CPC ...... F16B 41/002; F16B 39/10; F16B 5/0208; B62D 24/00
USPC ......................................... 411/999, 120, 121
See application file for complete search history.

(56) References Cited

U.S. PATENT DOCUMENTS

| | | | |
|---|---|---|---|
| 337,653 A * | 3/1886 | Beisel | F16B 39/10 411/986 |
| 2,984,144 A | 5/1961 | Erdmann | |
| 4,534,101 A * | 8/1985 | Rosan, Jr. | F16B 39/10 29/259 |
| 4,863,326 A * | 9/1989 | Vickers | F16B 41/002 411/105 |
| 5,304,021 A * | 4/1994 | Oliver | F16B 39/02 411/941.1 |
| 5,964,559 A * | 10/1999 | Larimore | F16B 39/10 411/120 |
| 6,139,113 A * | 10/2000 | Seliga | F16B 41/002 301/111.01 |
| 6,439,816 B1 * | 8/2002 | Nance | F16B 37/145 411/432 |
| 6,464,438 B1 * | 10/2002 | Dowling | F16B 41/002 411/372.6 |
| 7,036,875 B2 | 5/2006 | Kanie | |

(Continued)

FOREIGN PATENT DOCUMENTS

DE    19944685 A1    3/2001
KR    10-2021-0077367 A    6/2021

OTHER PUBLICATIONS

Extended European Search Report issued Jun. 23, 2023 for corresponding European Patent Application No. 22205275.5.

*Primary Examiner* — Flemming Saether
(74) *Attorney, Agent, or Firm* — Morgan, Lewis & Bockius LLP

(57) ABSTRACT

A fastening apparatus for a vehicle may include: first fastener fixed to a first structure, a case fixed to the second structure and configured to have the first fastener inserted into an one side of the case, an elevation unit installed within the case in a way to be movable up and down, a second fastener rotatably supported against the elevation unit, fastened to or separated from the first fastener in a rotation direction thereof, and moved up and down along with the elevation unit, and a locking unit configured to interfere with a work tool that enters an another side of the case and to selectively permit the rotation of the second fastener.

16 Claims, 19 Drawing Sheets

(56) References Cited

U.S. PATENT DOCUMENTS

| | | | |
|---|---|---|---|
| 11,767,066 B2* | 9/2023 | Woo | B62D 65/024 |
| | | | 296/35.1 |
| 2012/0255800 A1 | 10/2012 | Lejeune et al. | |
| 2012/0305323 A1 | 12/2012 | Baboy et al. | |
| 2017/0067501 A1* | 3/2017 | Furu-Szekely | F16B 39/24 |
| 2023/0356619 A1* | 11/2023 | You | B60L 53/80 |
| 2024/0059354 A1* | 2/2024 | Woo | B62D 24/02 |

\* cited by examiner

FASTENING APPARATUS FOR VEHICLE

CROSS-REFERENCE TO RELATED APPLICATION

This application claims priority from and the benefit of Korean Patent Application No. 10-2022-0014083 filed on Feb. 3, 2022, which is hereby incorporated by reference for all purposes as if set forth herein.

BACKGROUND

Technical Field

Exemplary embodiments of the present disclosure relate to a fastening apparatus for a vehicle, and more particularly, to a fastening apparatus for a vehicle, wherein a top hat or a battery module can be easily mounted on or separated from the chassis frame of a purpose built vehicle (PBV).

Discussion of the Background

In general, a purpose built vehicle (PBV) means a future type vehicle in which a user can freely use the indoor space of the PBV according to his or her purpose so that the user can be provided with a required customized service while the user moves to a destination with the development of the autonomous driving technology.

Such a PBV has a structure in which a top hat, that is, an upper vehicle body designed according to a user's purpose, is coupled to a chassis frame having a skateboard form in which a battery module is widely disposed on the lower side of the PBV. Accordingly, it is necessary to develop a new fastening structure through which the top hat or the battery module can be easily replaced from the chassis frame of the PBV and the automation of an assembly can be implemented.

The background technology of the present disclosure was disclosed in Korean Patent Application Publication No. 10-2021-0077367 (entitled "VEHICLE BODY ASSEMBLY STRUCTURE" laid open on Jun. 25, 2021).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments are directed to providing a fastening apparatus for a vehicle, wherein a top hat or a battery module can be easily mounted on or separated from the chassis frame of a purpose built vehicle (PBV).

In an embodiment, a fastening apparatus for a vehicle includes a first fastener fixed to a first structure, a case fixed to the second structure and configured to have the first fastener inserted into an one side of the case, an elevation unit installed within the case in a way to be movable up and down, a second fastener rotatably supported against the elevation unit, fastened to or separated from the first fastener in a rotation direction thereof, and moved up and down along with the elevation unit, and a locking unit configured to interfere with a work tool that enters an another side of the case and to selectively permit the rotation of the second fastener.

Furthermore, the locking unit includes a first locking unit connected to the other side of the case, and a second locking unit connected to the second fastener in a way to be movable up and down, fastened to or separated from the first locking unit in a moving direction thereof, and configured to selectively permit the rotation of the second fastener.

Furthermore, the first locking unit includes a first body part disposed to face the second locking unit, an entry hole formed to penetrate the first body part and configured to provide guidance to entry of the work tool into the case, and a first locking member configured to protrude from the first body part and trapped and connected to the second locking unit when the second locking unit is seated on the first body part.

Furthermore, the first locking member is provided in a plural number. The plurality of first locking members are spaced apart from each other at certain intervals in the circumferential direction of the first body part.

Furthermore, when the work tool enters the case, the second locking unit is moved upward and separated from the first locking unit. When the work tool escapes from the case, the second locking unit is moved downward and fastened to the first locking unit.

Furthermore, the second locking unit includes a second body part provided between the elevation unit and the second fastener and installed in a way to be slidingly movable in a length direction of the second fastener, a rotation prevention unit provided in the second body part so that a relative rotation of the second body part with respect to the second fastener is prevented, and a second locking member extended from the second body part and connected to the first locking unit when the second body part is moved downward by a certain distance or more.

Furthermore, the rotation prevention unit is formed to have a polygonal cross-section shape and trapped and connected to the second fastener.

Furthermore, the second locking member includes a plurality of sawtooth parts configured to protrude in the radial direction of the second body part from the outer circumference surface of the second body part.

Furthermore, the sawtooth parts come into contact with the first locking unit, and restrict the second fastener from being rotated in a direction in which the second fastener is separated from the first fastener.

Furthermore, the elevation unit includes an elevation member installed within the case and configured to have the second fastener inserted therein, a guide part extended from the elevation member and connected to the case in a way to be slidingly movable, and a support part extended from the elevation member and configured to rotatably support the second fastener.

Furthermore, the second fastener includes a second fastening member disposed within the elevation member and configured to have a screw thread provided on the inner circumference surface of the second fastening member, a trapping part extended from the second fastening member and rotatably connected to an one side of the support part, and a flange extended from the second fastening member and configured to prevent an up and down movement of the second fastening member with respect to the elevation unit by coming into contact with an another side of the support part.

Furthermore, the second fastening member has a polygonal cross-section shape.

Furthermore, the fastening apparatus further includes a restoration part configured to restore the elevation unit to an initial location when the second fastener is separated from the first fastener.

Furthermore, the restoration part is installed between the case and the elevation unit and is provided in a stretchable manner in the length direction of the restoration part.

Furthermore, both ends of the restoration part come into surface contact with the case and the elevation unit, respectively.

Furthermore, each of the both ends of the restoration part has a cross section having a semi-circular form.

The fastening apparatus for a vehicle according to the present disclosure can prevent the waste of a machine and manpower for an additional feeding work and a loss of parts upon assembly because parts necessary for the fastening of the first structure and the second structure can be implemented as one assembly.

Furthermore, the fastening apparatus for a vehicle according to the present disclosure can prevent an erroneous assembly because the second fastener is supported in a way to be rotatable and movable up and down in the state in which the second fastener maintains its regular position with respect to the first fastener by the elevation unit.

Furthermore, the fastening apparatus for a vehicle according to the present disclosure can prevent the second fastener from being arbitrarily separated from the first fastener due to a slip occurring between the case and the second fastener when vibration occurs in a vehicle due to the locking unit.

Furthermore, the fastening apparatus for a vehicle according to the present disclosure can improve efficiency and consistency of an assembly because the fastening and separation of the first fastener and the second fastener can be repeatedly performed by the restoration part.

Furthermore, the fastening apparatus for a vehicle according to the present disclosure can reduce weight of a product and an assembly can be more easily performed because both ends of the restoration part directly come into surface contact with the case and the elevation unit.

DETAILED DESCRIPTION OF THE ILLUSTRATED EMBODIMENTS

Figure 1:
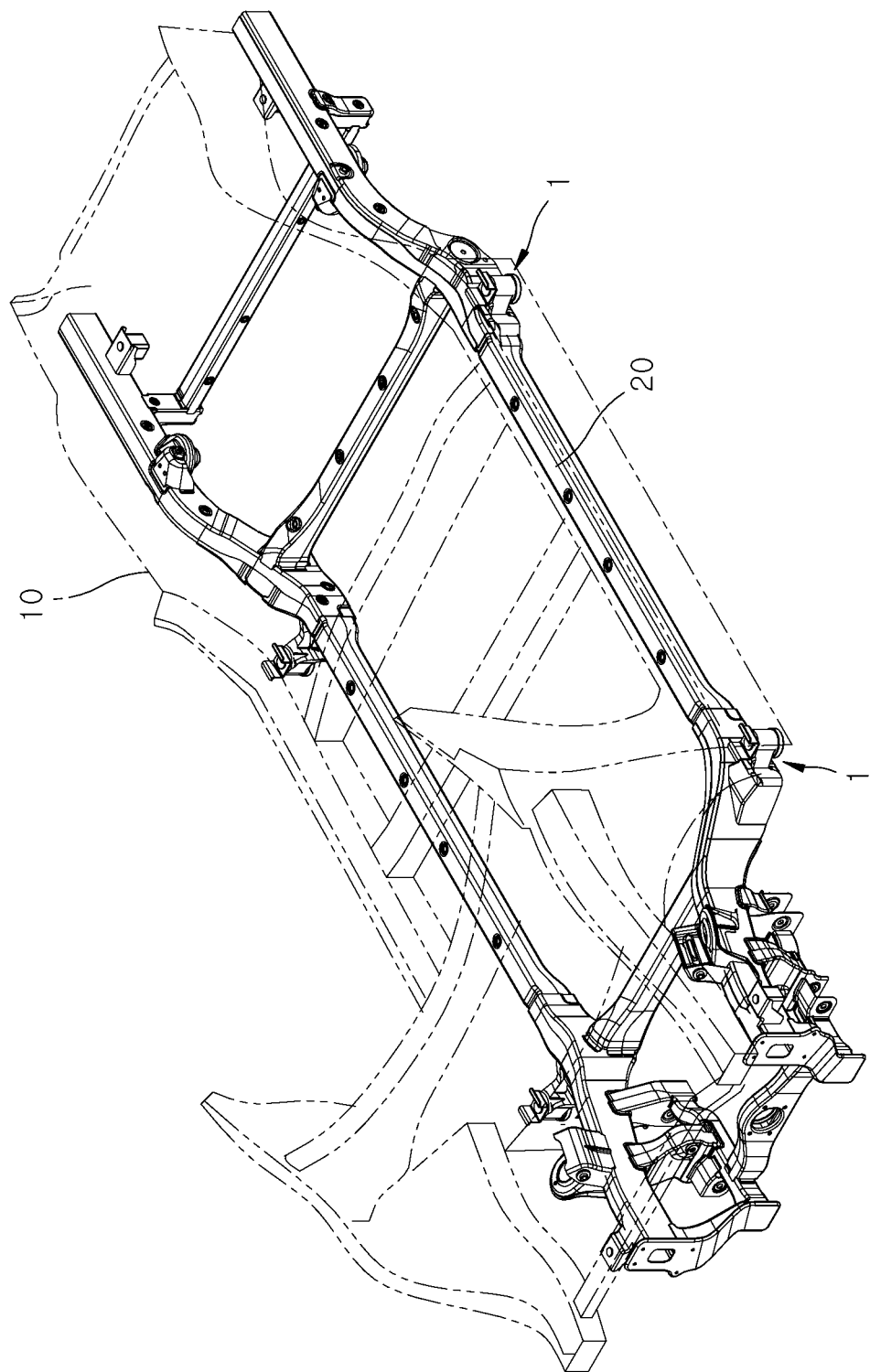
FIG. 1 is an installation state diagram schematically illustrating the state in which a fastening apparatus for a vehicle according to an embodiment of the present disclosure has been installed.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
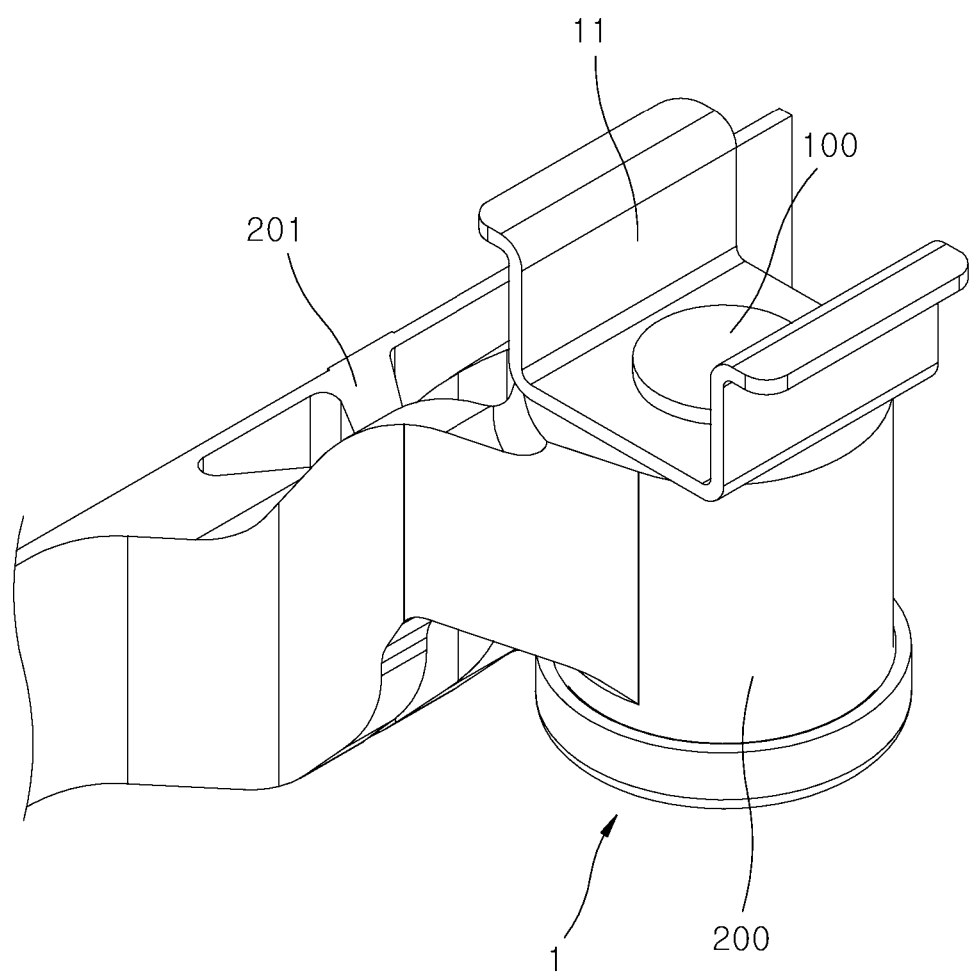
FIG. 2 is a perspective view schematically illustrating a configuration of the fastening apparatus for a vehicle according to an embodiment of the present disclosure.
Figure 3:
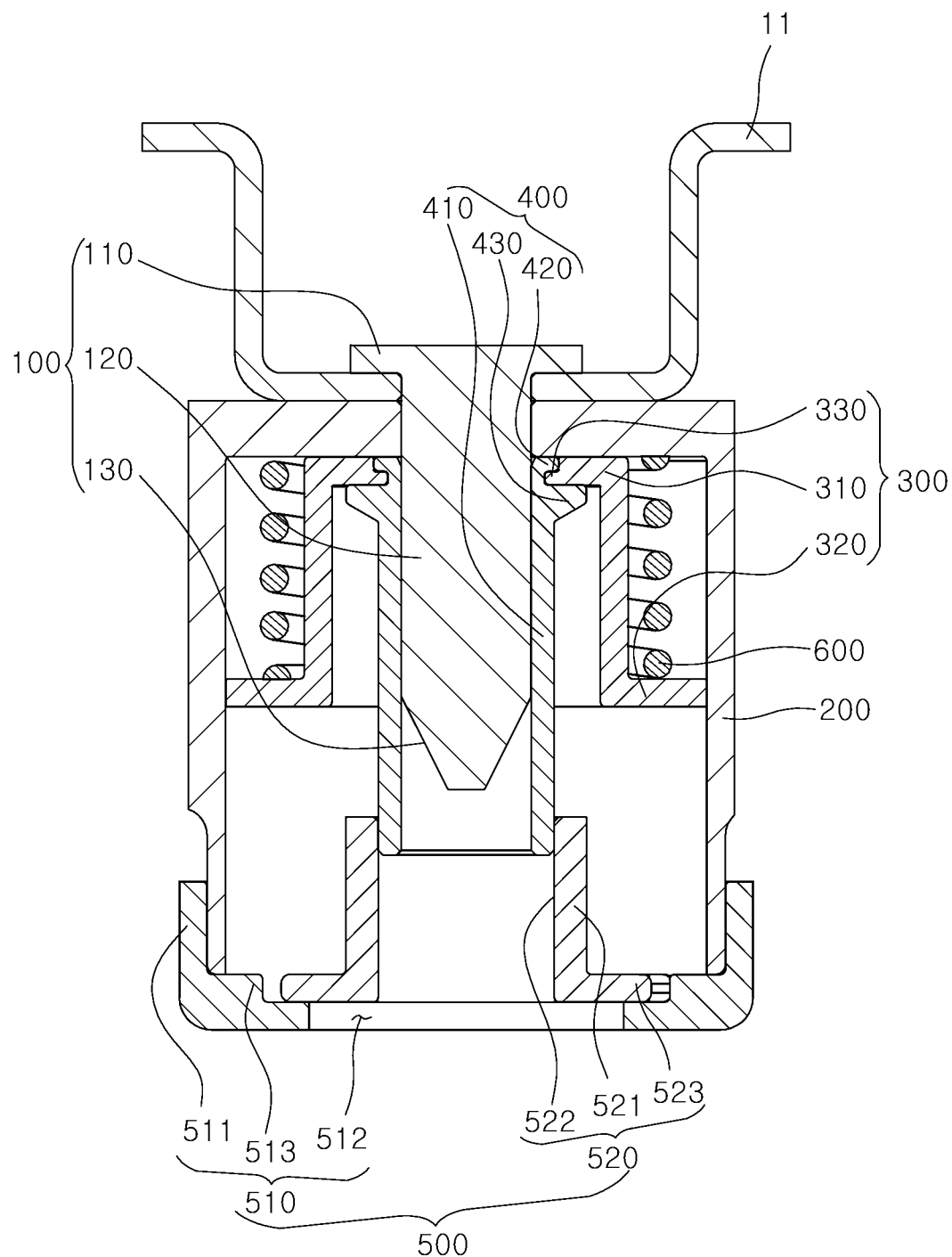
FIG. 3 is a cross-sectional view schematically illustrating a configuration of the fastening apparatus for a vehicle according to an embodiment of the present disclosure.
Figure 4:
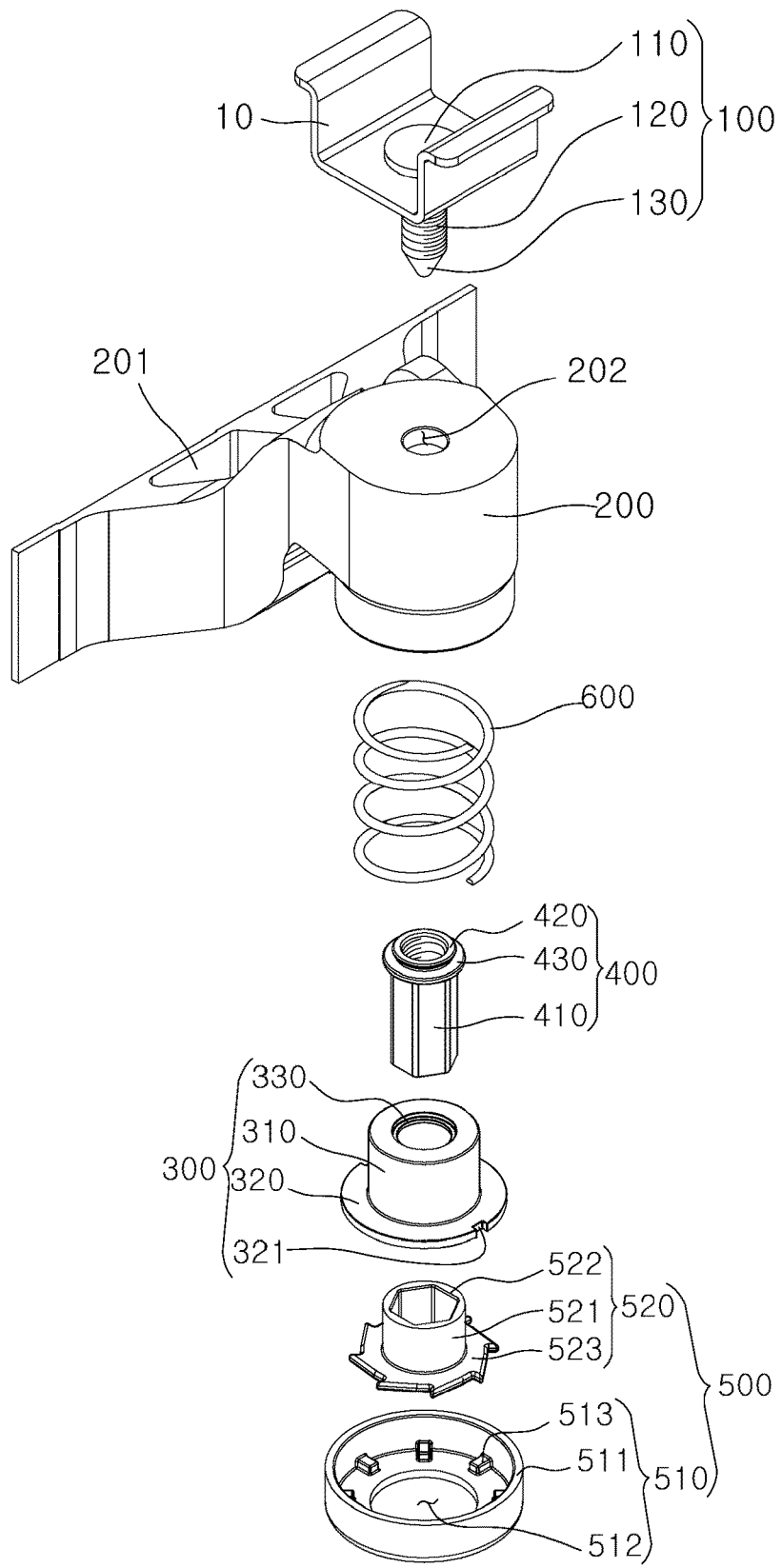
FIG. 4 is an exploded perspective view schematically illustrating a configuration of the fastening apparatus for a vehicle according to an embodiment of the present disclosure.

FIG. 1 is an installation state diagram schematically illustrating the state in which a fastening apparatus for a vehicle according to an embodiment of the present disclosure has been installed. FIG. 2 is a perspective view schematically illustrating a configuration of the fastening apparatus for a vehicle according to an embodiment of the present disclosure. FIG. 3 is a cross-sectional view schematically illustrating a configuration of the fastening apparatus for a vehicle according to an embodiment of the present disclosure. FIG. 4 is an exploded perspective view schematically illustrating a configuration of the fastening apparatus for a vehicle according to an embodiment of the present disclosure.

Referring to FIGS. 1 to 4, a fastening apparatus 1 for a vehicle according to an embodiment of the present disclosure includes a first fastener 100, a case 200, an elevation unit 300, a second fastener 400, a locking unit 500, and a restoration part 600.

A first structure 10 and a second structure 20 that are described hereinafter may be exemplified as a top hat corresponding to a vehicle body which can be customized and replaced depending on a user's purpose and a chassis frame that is installed on the lower side of a vehicle and that structurally supports the vehicle, respectively. However, the first structure 10 and the second structure 20 are not limited to the top hat and the chassis frame, and may be variously changed in design as different structures which may be fastened together and separated from each other up and down in a vehicle, such as a chassis frame and a battery module.

The first fastener 100 is fixed to the first structure 10 and fastened to the second fastener 400 that is described later, and mutually fixes the first structure 10 and the second structure 20.

The first fastener 100 according to an embodiment of the present disclosure includes a fixing part 110, an extension part 120, and an entry guide part 130.

The fixing part 110 forms an external appearance of the top of the first fastener 100 according to an embodiment of the present disclosure, and generally supports the extension part 120 and the entry guide part 130 that are described later. The fixing part 110 according to an embodiment of the present disclosure is seated and fixed to the inner side of a bracket part 11 that is connected to the first structure 10. The fixing part 110 may be welded or bonded to the inner side of the bracket part 11 and integrally connected to the bracket part 11. A detailed shape of the fixing part 110 may be changed in design in various forms which may be seated and fixed to the inner side of the bracket part 11, in addition to the circular shape illustrated in FIG. 4.

The extension part 120 is extended from the fixing part 110, and forms an external appearance of the central part of the first fastener 100. The extension part 120 according to an embodiment of the present disclosure may be formed to have a form of a rod that is perpendicularly extended downward from the inner side of the fixing part 110. The extension part 120 is extended downward from the bracket part 11 through the inner side of the bracket part 11. A screw thread is formed along the outer circumference surface of the extension part 120 in the length direction of the extension part 120 so that the extension part 120 is screwed onto the second fastener 400 that is described later.

The entry guide part 130 is extended from the extension part 120, and forms an external appearance of a lower part of the first fastener 100. The entry guide part 130 is provided to provide guidance to the extension part 120 so that the extension part 120 enters the inside of the second fastener 400 in a process of the first fastener 100 and the second fastener 400 being fastened together. The entry guide part 130 according to an embodiment of the present disclosure is perpendicularly extended downward from the bottom of the extension part 120. The entry guide part 130 is formed so that the width of the entry guide part 130 is reduced toward an end thereof. Accordingly, the entry guide part 130 may be formed to have a shape of approximately a cone.

Figure 14:
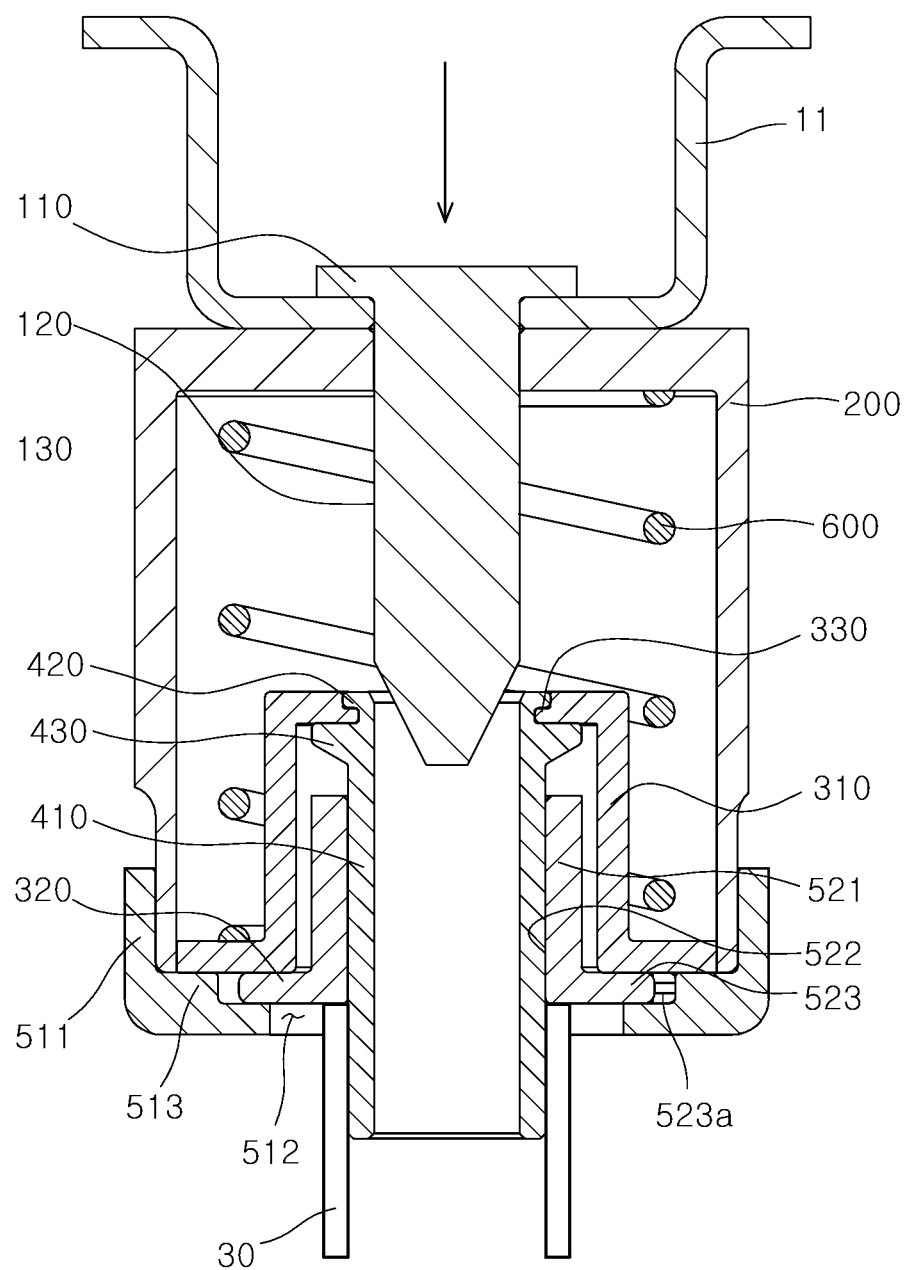
FIGS. 14 to 17 are diagrams schematically illustrating a process of the first fastener and the second fastener being fastened together according to an embodiment of the present disclosure.
Figure 15:
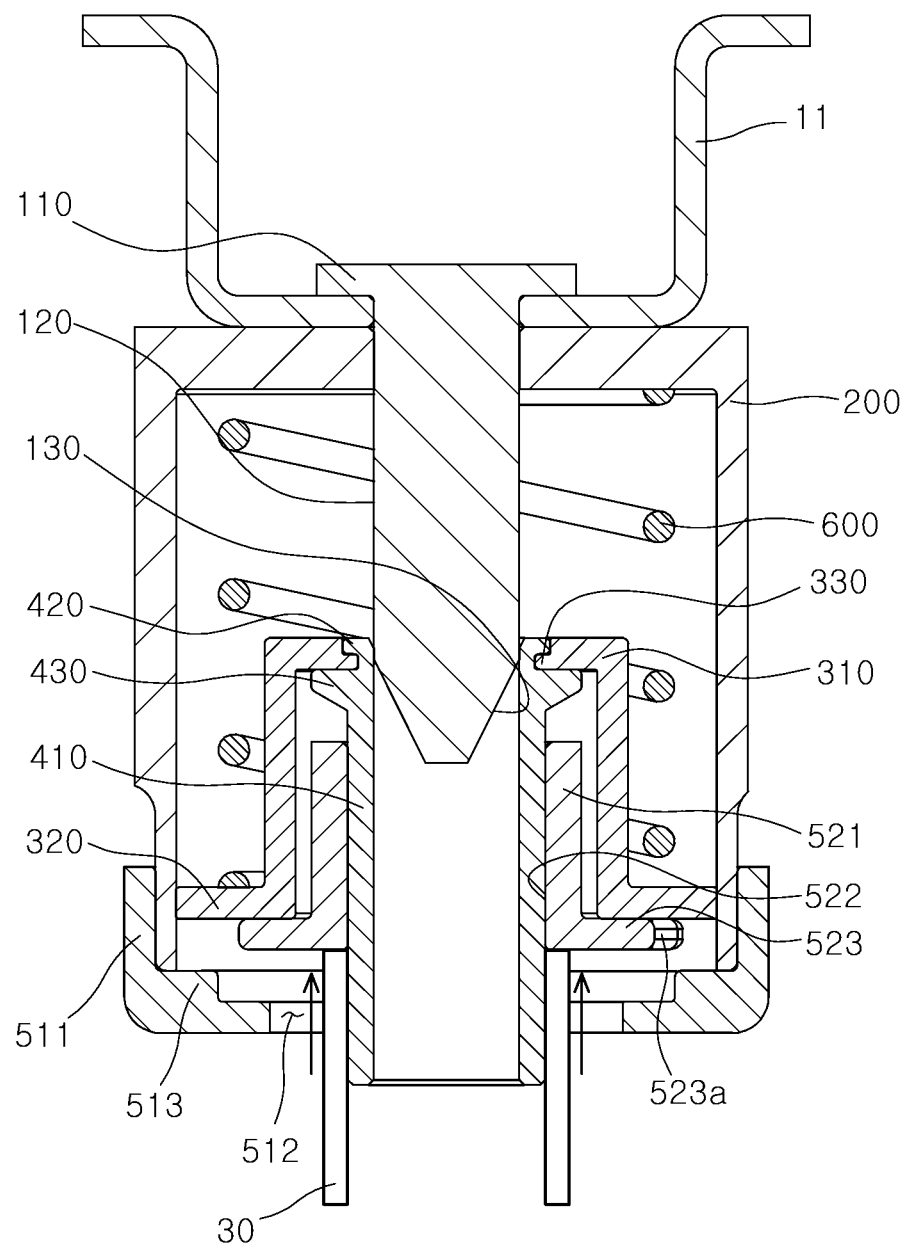
Figure 16:
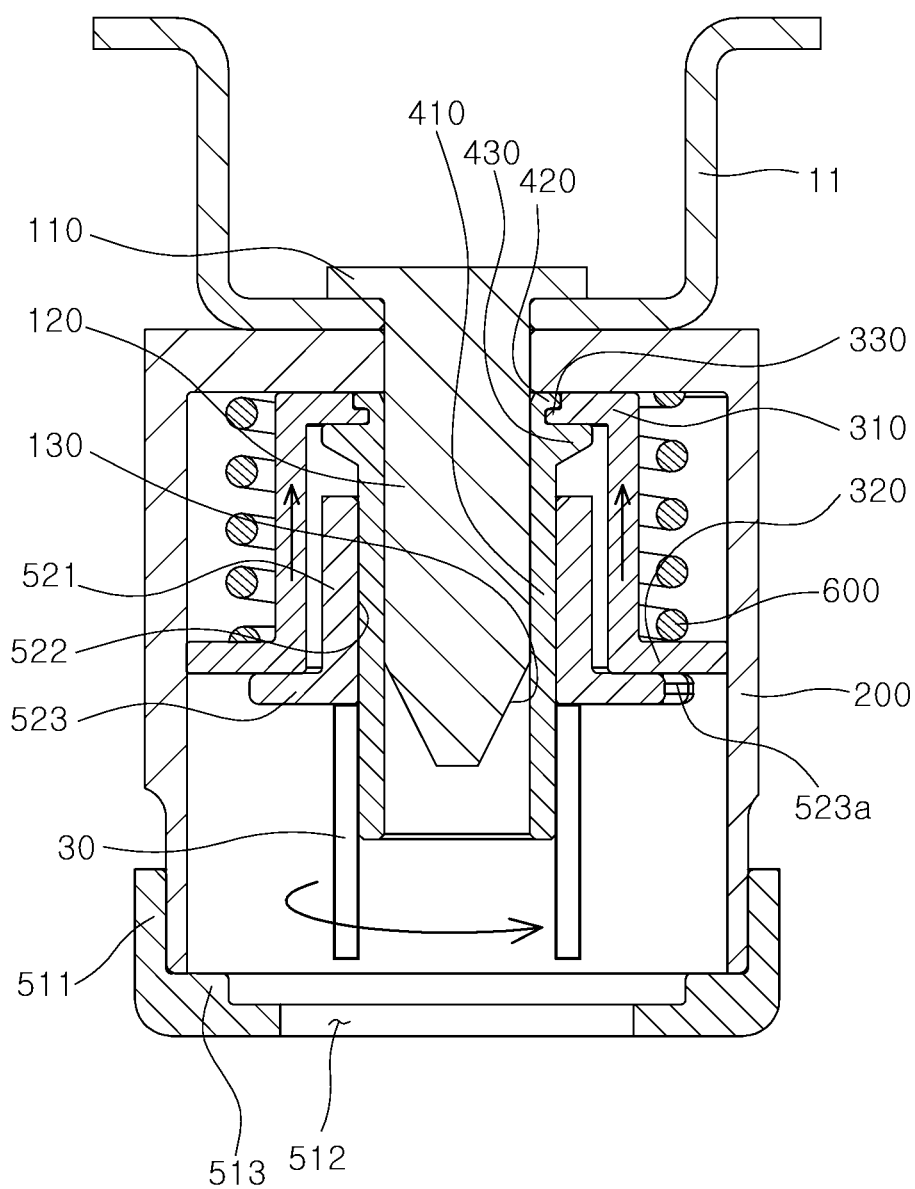
Figure 17:
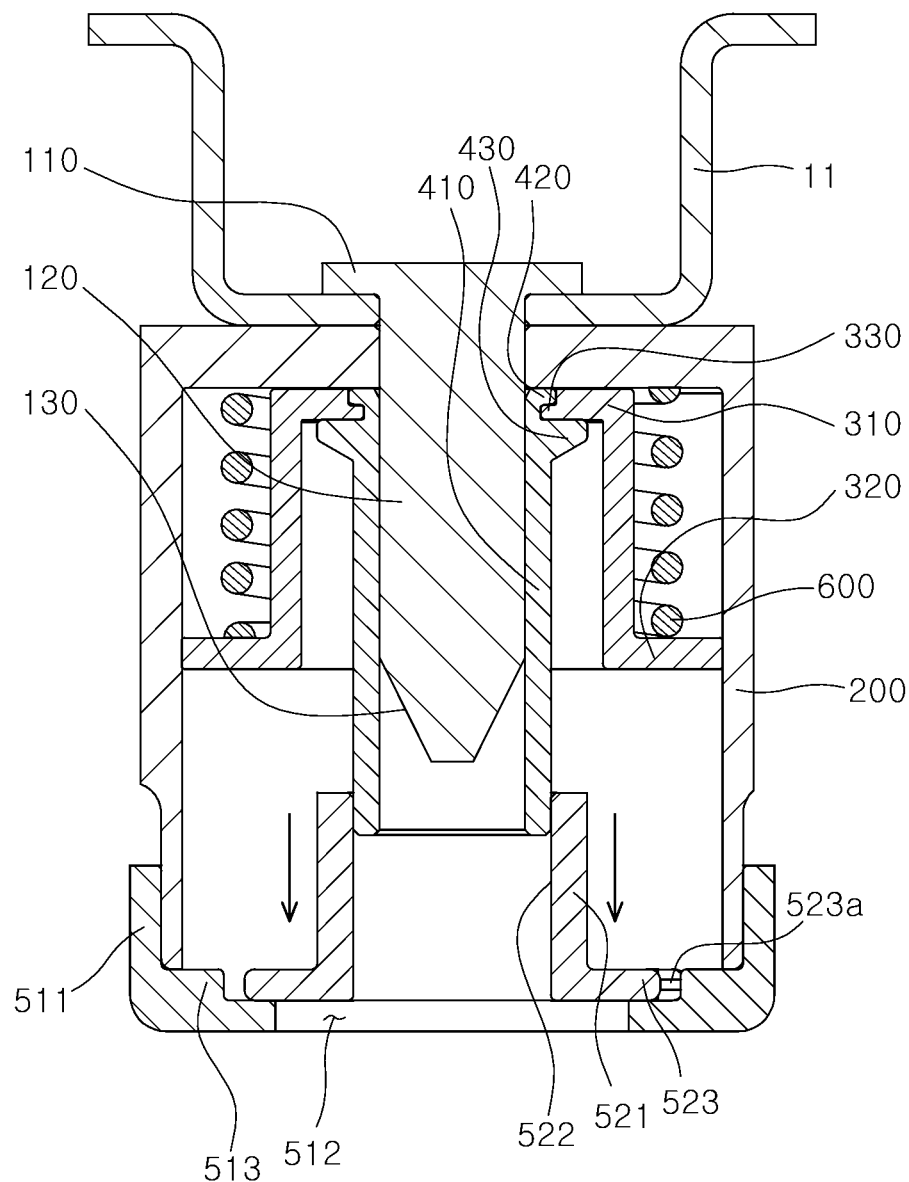

The case 200 is fixed to the second structure 20, and generally supports the elevation unit 300, the locking unit 500, and the restoration part 600 which are described later. The case 200 is provided in a way that the first fastener 100 is inserted into the case 200 on the upper side of the case 200 so that a fastening operation of the first fastener 100 and the second fastener 400 may be performed within the case 200 and that a work tool 30 (refer to FIG. 14), such as a socket wrench, enters the case 200 on the lower side of the case 200.

Figure 5A:
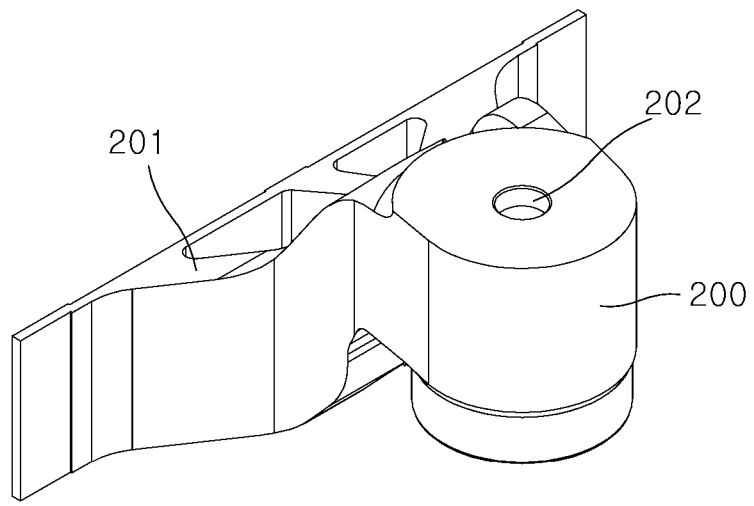
FIGS. 5A and 5B are a perspective view schematically illustrating a configuration of a case according to an embodiment of the present disclosure.
Figure 5B:
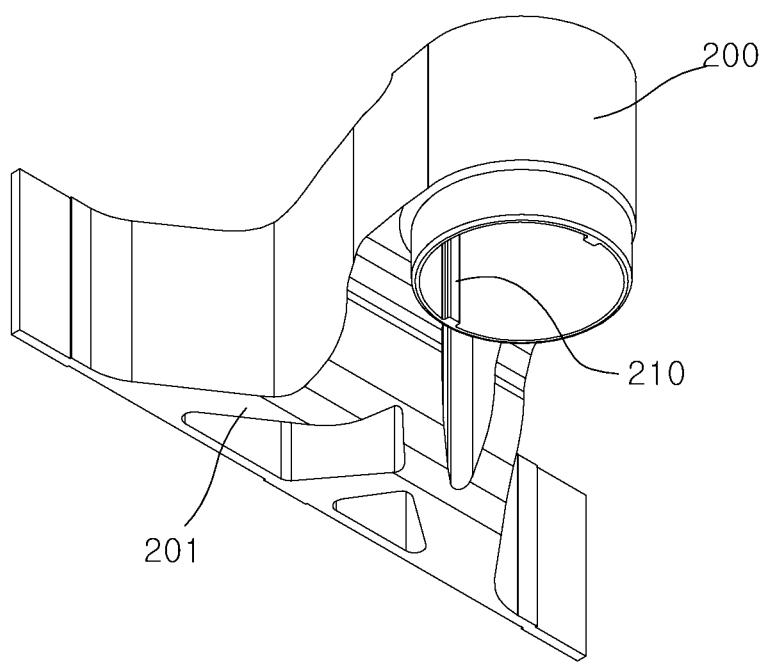

FIGS. 5A and 5B are a perspective view schematically illustrating a configuration of the case according to an embodiment of the present disclosure.

Referring to FIGS. 4, 5A and 5B, the case 200 according to an embodiment of the present disclosure may have an empty inside, and may be formed to have a cylindrical shape the bottom of which is opened. The length direction of the case 200 is parallel to the length direction of the first fastener 100. The case 200 may be supported against the second structure 20 through the medium of an assembly part 201 that is extended from the side of the case 200. In this case, the assembly part 201 may be integrally connected to the second structure 20 by welding or bonding, or may be detachably connected to the second structure 20 by bolting.

An insertion hole part 202 into which the first fastener 100 is inserted is formed at the top of the case 200. The insertion hole part 202 according to an embodiment of the present disclosure may be formed to have a form of a hole that perpendicularly penetrates the top of the case 200 up and down. The insertion hole part 202 may be formed to have a diameter greater than the diameter of the extension part 120 so that an operation of the first fastener 100 being inserted into the insertion hole part 202 is smoothly performed.

A guide rail 210 may be formed within the case 200. The guide rail 210 according to an embodiment of the present disclosure perpendicularly protrudes from the inner circumference surface of the case 200 toward an internal space of the case 200. However, the guide rail 210 is not limited to such a shape, and may be formed in the form of a groove that is concavely depressed from the inner circumference surface of the case 200 toward the outer circumference surface of the case 200. The length direction of the guide rail 210 is extended in parallel to the length direction of the case 200. The guide rail 210 may be provided in a plural number. In this case, the plurality of guide rails 210 may be spaced apart from each other and disposed along an inner circumference surface of the case 200.

The elevation unit 300 is installed within the case 200 in a way to be movable up and down. The elevation unit 300 functions as a component that lines up the second fastener 400 to its regular position within the case 200 and that also provides guidance to a movement of the second fastener 400 in a process of the first fastener 100 and the second fastener 400 being fastened together.

Figure 6:
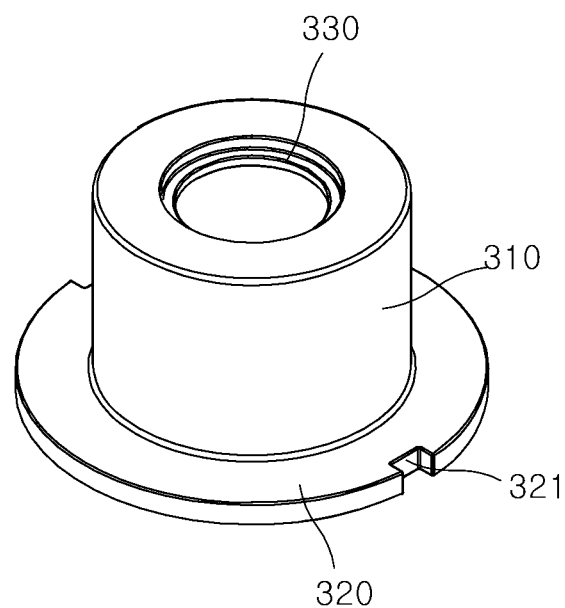
FIG. 6 is a perspective view schematically illustrating a configuration of an elevation unit according to an embodiment of the present disclosure.

FIG. 6 is a perspective view schematically illustrating a configuration of the elevation unit according to an embodiment of the present disclosure.

Referring to FIGS. 1 to 6, the elevation unit 300 according to an embodiment of the present disclosure includes an elevation member 310, a guide part 320, and a support part 330.

The elevation member 310 forms a schematic external appearance of the elevation unit 300, and is installed within the case 200 in a way to be movable up and down. The elevation member 310 according to an embodiment of the present disclosure is formed to have a hollow cylindrical shape having both ends opened, and is installed within the case 200. The outer circumference surface of the elevation member 310 is disposed to be spaced apart from the inner circumference surface of the case 200 at a certain interval so that the elevation member 310 is smoothly moved up and down within the case 200 and provides the space in which the guide part 320 and the restoration part 600 that are described later may be installed.

The guide part 320 is extended from the outer circumference surface of the elevation member 310, and is connected to the guide rail 210 that is provided on the inner circumference surface of the case 200 in a way to be slidingly movable. The guide part 320 according to an embodiment of the present disclosure may be formed to have a form of a circular plate that is transversely extended in the radial direction of the elevation member 310 from the outer circumference surface of the bottom of the elevation member 310.

The guide part 320 is connected to the guide rail 210 in a way to be slidingly movable through the medium of a guide member 321 that is formed in the outer circumference surface of the guide part 320. The guide member 321 according to an embodiment of the present disclosure may be formed to have a form of a groove that is concavely depressed from the outer circumference surface of the elevation member 310 toward the central axis of the elevation member 310. The guide member 321 is formed to have a cross section corresponding to a cross section of the guide rail 210 that protrudes from the inner circumference surface of the case 200, and is inserted into the guide rail 210. The guide member 321 is slidingly moved in the length direction of the guide rail 210, and supports the elevation member 310 with respect to the case 200 in a way to be movable up and down. However, the guide member 321 is not limited to such a form. If the guide rail 210 is concavely depressed from the inner circumference surface of the case 200, the guide member 321 may be formed in a form that protrudes from the outer circumference surface of the elevation member 310. The guide member 321 may be provided in a plural number, and the plurality of guide members 321 may be disposed to be spaced apart from each other at certain intervals along the outer circumference surface of the elevation member 310.

The support part 330 is extended from the inner circumference surface of the elevation member 310, and rotatably supports the second fastener 400 that is described later. The support part 330 according to an embodiment of the present disclosure may be formed to have a form of a ring that is transversely extended from the inner circumference surface of the top of the elevation member 310 toward the inside thereof in the radial direction of the elevation member 310. The support part 330 is formed to have a cross section having a stair form so that the support part 330 is trapped and connected to a trapping part 420 that is described later. That is, the bottom of the support part 330 may be more elongated toward the central axis of the elevation member 310 than the top of the support part 330.

The second fastener 400 is rotatably supported against the elevation unit 300. The second fastener 400 is connected to the work tool 30 that enters the lower side of the case 200, and is clockwise or counterclockwise rotated around the central axis thereof by rotatory power that is applied by the work tool 30. The second fastener 400 is fastened to or separated from the first fastener 100 depending on a rotation direction thereof, and is moved up and down within the case 200 along with the elevation unit 300. That is, the second fastener 400 is connected to the elevation unit 300 in a way to be moved up and down integrally with the elevation unit 300 and also to be relatively rotated with respect to the elevation unit 300.

Figure 7:
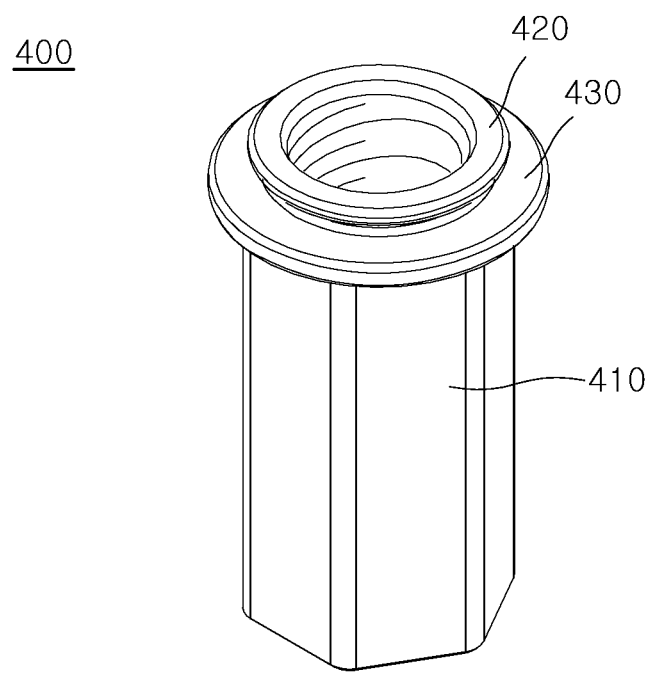
FIG. 7 is a perspective view schematically illustrating a configuration of a second fastener according to an embodiment of the present disclosure.

FIG. 7 is a perspective view schematically illustrating a configuration of the second fastener according to an embodiment of the present disclosure.

Referring to FIGS. 1 to 7, the second fastener 400 according to an embodiment of the present disclosure includes a second fastening member 410, the trapping part 420, and a flange 430.

The second fastening member 410 according to an embodiment of the present disclosure is formed to have a shape of a hollow rod, and is inserted into the elevation member 310. The second fastening member 410 is formed to have a smaller diameter than the elevation member 310. The outer circumference surface of the second fastening member 410 is disposed to be spaced apart from the inner circumference surface of the elevation member 310 at a certain interval. Accordingly, the second fastening member 410 may be smoothly rotated within the elevation member 310 without particular intervention, and may provide the space in which a second locking unit 520 that is described later may be installed between the second fastening member 410 and the elevation member 310. A screw thread that is screwed onto the outer circumference surface of the extension part 120 is provided on the inner circumference surface of the second fastening member 410. The second fastening member 410 is formed to have a length in which the bottom thereof may protrude downward from the elevation member 310. Accordingly, the second fastening member 410 can improve the accessibility of the work tool 30.

The second fastening member 410 may be formed to have a polygonal cross-section shape. For example, the cross-section shape of the second fastening member 410 may be a hexagon. Accordingly, the second fastening member 410 can be efficiently provided with rotatory power from the work tool 30, and can also prevent the second locking unit 520 that is described later from being relatively rotated with respect to the second fastening member 410.

The trapping part 420 is extended from the second fastening member 410 and rotatably connected to one side of the support part 330, and supports the second fastening member 410 with respect to the elevation unit 300 in a way to be relatively rotatable.

Figure 8:
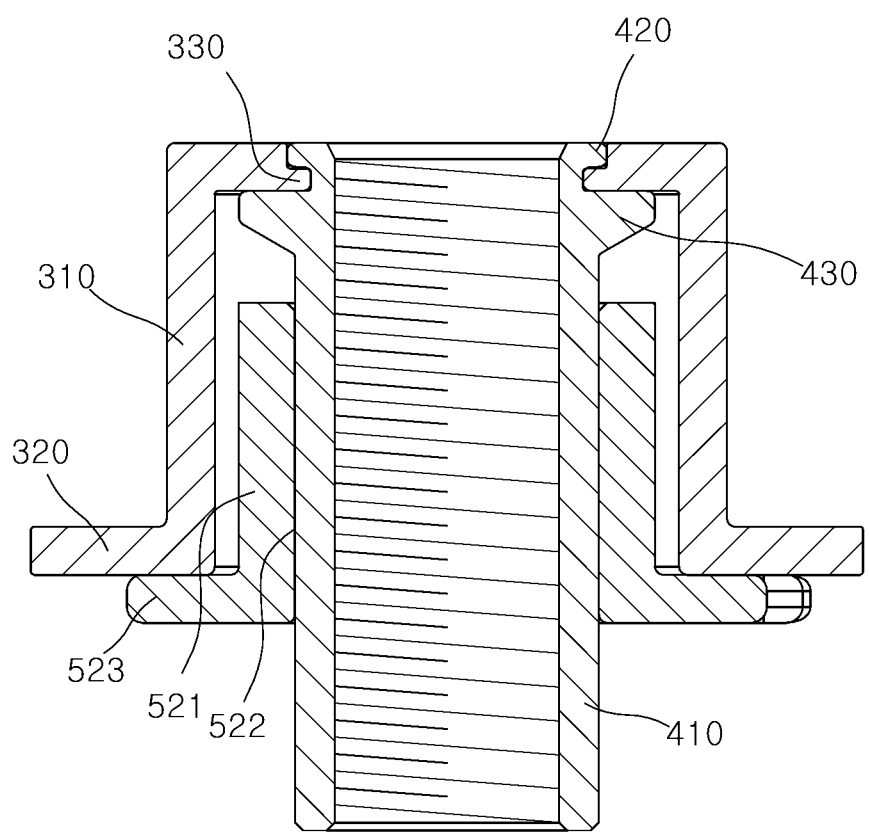
FIG. 8 is an enlarged view schematically illustrating a configuration of a trapping part and a flange according to an embodiment of the present disclosure.

FIG. 8 is an enlarged view schematically illustrating a configuration of the trapping part and the flange according to an embodiment of the present disclosure.

Referring to FIG. 8, the trapping part 420 according to an embodiment of the present disclosure is bent from the top of the second fastening member 410 toward the outside of the second fastening member 410 in the radial direction thereof in the form of approximately "¬". The lower side of the trapping part 420 is seated and supported by the upper side of the bottom of the support part 330 so that the second fastening member 410 can be relatively rotated around the support part 330 when the second fastening member 410 is rotated around the central axis thereof.

The flange 430 is extended from the second fastening member 410, and prevents an up and down movement of the second fastening member 410 with respect to the elevation unit 300 by coming into contact with the other side of the support part 330. Accordingly, the second fastening member 410 may be moved up and down integrally with the elevation member 310, and may also be supported in the state in which the second fastening member 410 may be relatively rotated around the elevation member 310.

The flange 430 according to an embodiment of the present disclosure is transversely extended from the outer circumference surface of the second fastening member 410 to the outside of the second fastening member 410 in the radial direction thereof. The flange 430 is spaced apart from the trapping part 420 at a certain interval in the length direction of the second fastening member 410, and is disposed to face the trapping part 420. When the trapping part 420 is seated in the support part 330, the flange 430 is disposed to face the lower side of the bottom of the support part 330 and is disposed to surround the bottom of the support part 330 along with the trapping part 420. The interval between the flange 430 and the trapping part 420 may be changed in design in various ways within a size in which the trapping part 420 may be relatively rotated around the support part 330 and an up and down movement of the second fastening member 410 may be limited to a set range.

The locking unit 500 selectively permits the rotation of the second fastener 400 by interfering with the work tool 30 that enters the lower side of the case 200. More specifically, in a process of the work tool 30 entering the case 200 and the second fastener 400 being fastened to or separated from the first fastener 100, the locking unit 500 permits the rotation of the second fastener 400. Furthermore, when the work tool 30 is removed from the case 200 after the second fastener 400 is fully fastened to the first fastener 100, the locking unit 500 restricts the rotation of the second fastener 400. Accordingly, the locking unit 500 can prevent the second fastener 400 from being arbitrarily separated from the first fastener 100 due to a slip occurring between the case 200 and the second fastener 400 when vibration occurs in a vehicle.

Figure 9:
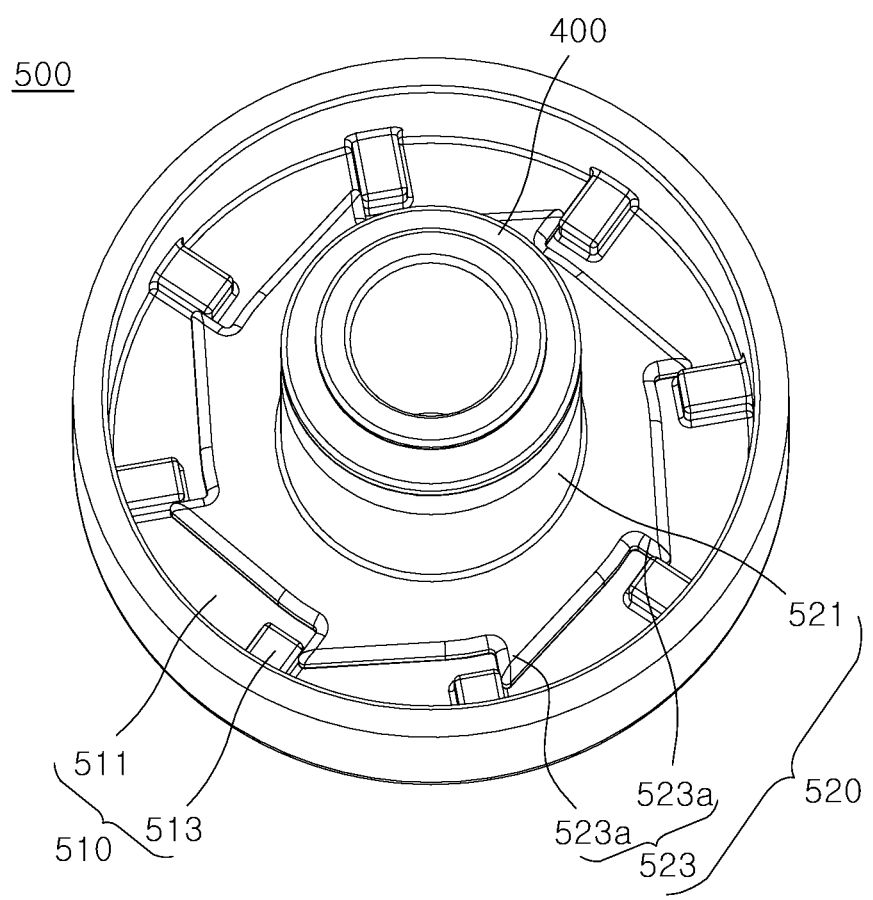
FIG. 9 is a perspective view schematically illustrating a configuration of a locking unit according to an embodiment of the present disclosure.
Figure 10:
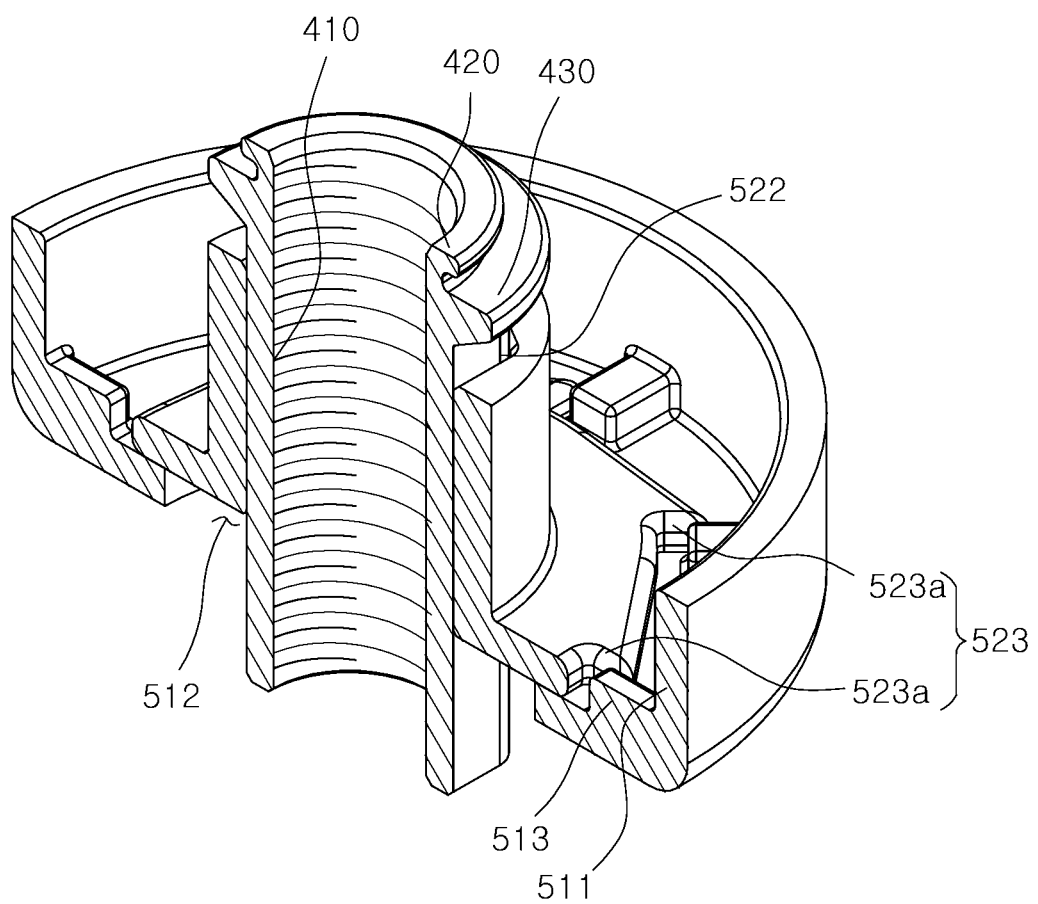
FIG. 10 is a cross-sectional perspective view schematically illustrating a configuration of the locking unit according to an embodiment of the present disclosure.

FIG. 9 is a perspective view schematically illustrating a configuration of the locking unit according to an embodiment of the present disclosure. FIG. 10 is a cross-sectional perspective view schematically illustrating a configuration of the locking unit according to an embodiment of the present disclosure.

Referring to FIGS. 3, 9, and 10, the locking unit 500 according to an embodiment of the present disclosure includes a first locking unit 510 and the second locking unit 520.

The first locking unit 510 is connected to the lower side of the case 200, and provides guidance to the entry of the work tool 30 into the case 200. The first locking unit 510 selectively permits the rotation of the second fastener 400 while operating in conjunction with an elevation movement of the second locking unit 520 that is described later by the work tool 30.

Figure 11:
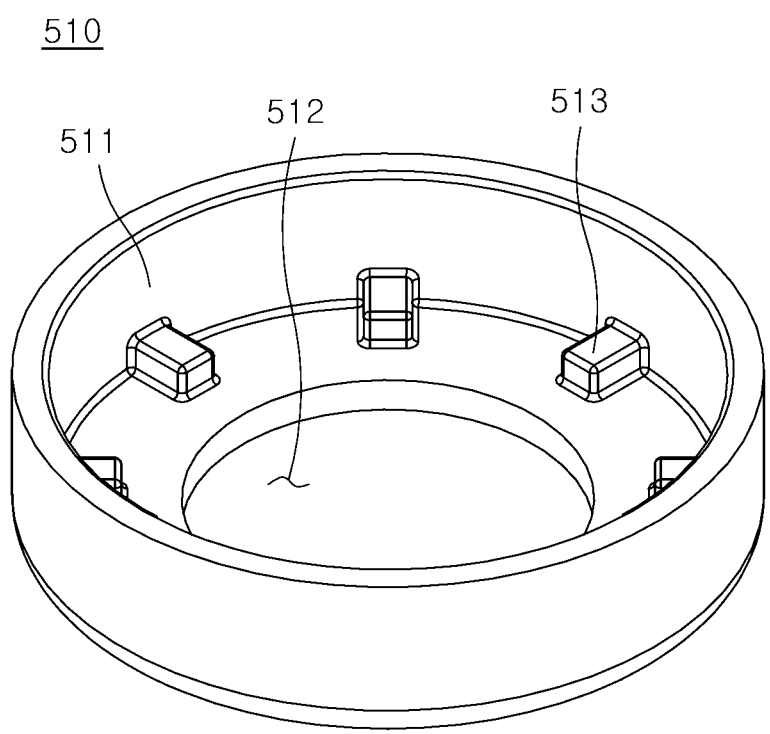
FIG. 11 is a perspective view schematically illustrating a configuration of a first locking unit according to an embodiment of the present disclosure.

FIG. 11 is a perspective view schematically illustrating a configuration of the first locking unit according to an embodiment of the present disclosure.

Referring to FIG. 11, the first locking unit 510 according to an embodiment of the present disclosure includes a first body part 511, an entry hole 512, and a first locking member 513.

The first body part 511 forms a schematic external appearance of the first locking unit 510, and is disposed to face the second locking unit 520 that is described later. The first body part 511 according to an embodiment of the present disclosure may be formed to have a cylindrical shape having a top opened. The opened top of the first body part 511 is disposed to face the bottom of the case 200, and the inner circumference surface of the first body part 511 is connected to the outer circumference surface of the case 200. In this case, the first body part 511 may be formed integrally with the case 200, may be fabricated separately from the case 200, and may be connected to the case 200 in a way to be separable from the case 200.

The entry hole 512 is formed to penetrate the first body part 511, and provides guidance to the entry of the work tool 30 into the case 200. The entry hole 512 according to an embodiment of the present disclosure may be formed to have a form of a hole that perpendicularly penetrates the bottom of the first body part 511 up and down. The central axis of the entry hole 512 is disposed to be placed on the same axis as the central axis of the first body part 511. The diameter of the entry hole 512 is formed to be greater than the diameter of the work tool 30 and to be smaller than the diameter of each of the guide part 320 and the second locking member 523 that is described later. Accordingly, the entry hole 512 can prevent interference with the work tool 30 that enters the lower side of the case 200, and can prevent the elevation unit 300 and the second locking unit 520 that are installed within the case 200 from being detached downward from the case 200 by their own weight.

The first locking member 513 protrudes from the first body part 511. The first locking member 513 is trapped and connected to the second locking unit 520 when the second locking unit 520 that is described later is seated on the first body part 511, and restricts the rotation of the second fastener 400. The first locking member 513 according to an embodiment of the present disclosure may be formed to have a form of a protrusion that perpendicularly protrudes from the lower side of the first body part 511 toward the inside of the case 200. The first locking member 513 has one side integrally connected to the inner circumference surface of the first body part 511 and the other side extended from the inner circumference surface of the first body part 511 in the radial direction of the first body part 511. The other side of the first locking member 513 is disposed to be spaced apart from the central axis of the first body part 511 so that the space in which the second locking unit 520 that is described later may be seated on the first body part 511 is provided. The first locking member 513 is provided in a plural number. The plurality of first locking members 513 is disposed to be spaced apart from each other at certain intervals in the circumferential direction of the first body part 511. The number of first locking member 513 and an interval between the first locking members 513 are not limited to those illustrated in FIG. 11, and may be variously changed in design depending on the size of the first body part 511. Furthermore, a cross-section shape of the first locking member 513 may be changed in design in various ways within the technical spirit of a form which may be trapped and connected to the second locking unit 520, in addition to the quadrangle illustrated in FIG. 11.

The second locking unit 520 is connected to the second fastener 400 in a way to be movable up and down. The second locking unit 520 is moved up and down by an external force from the work tool 30 that has entered the case 200. The second locking unit 520 is fastened to or separated from the first locking unit 510 in a moving direction thereof, and selectively permits the rotation of the second fastener 400. More specifically, when the work tool 30 enters the case 200, the second locking unit 520 is moved upward and is separated from the first locking unit 510, permitting the rotation of the second fastener 400. Furthermore, when the work tool 30 escapes from the case 200, the second locking unit 520 is moved downward by its own weight and fastened to the first locking unit 510, and permits the rotation of the second fastener 400.

Figure 12:
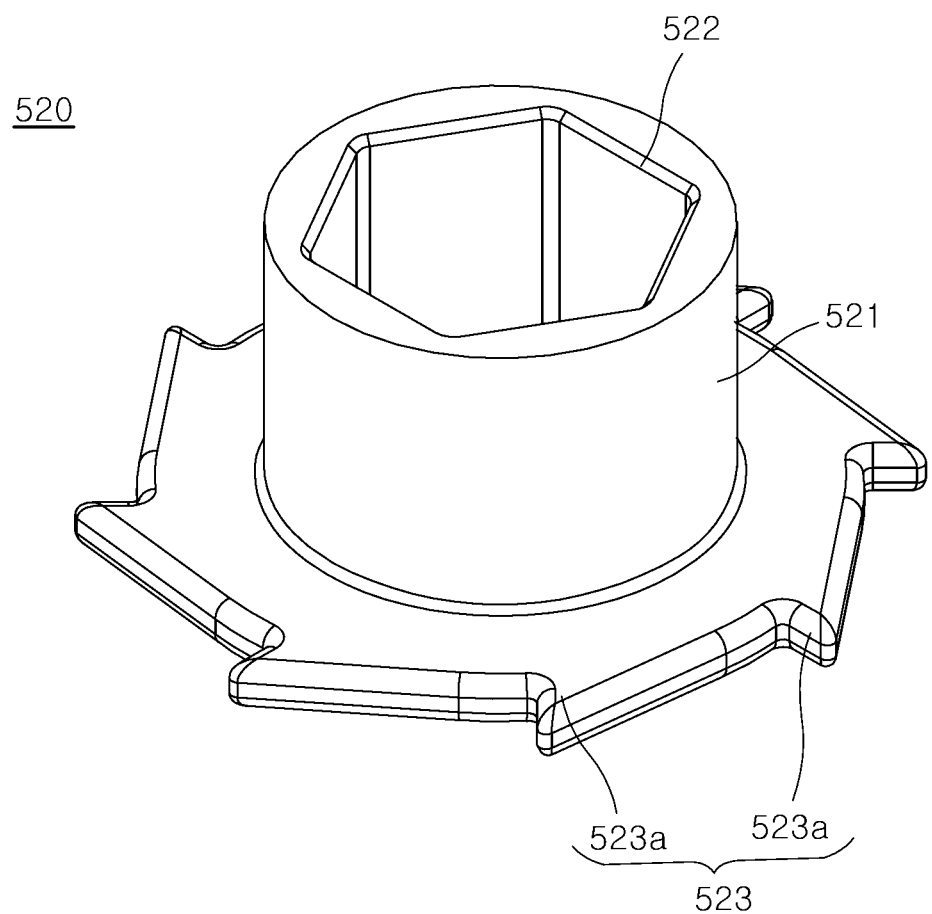
FIG. 12 is a perspective view schematically illustrating a configuration of a second locking unit according to an embodiment of the present disclosure.

FIG. 12 is a perspective view schematically illustrating a configuration of a second locking unit according to an embodiment of the present disclosure.

Referring to FIG. 12, the second locking unit 520 according to an embodiment of the present disclosure includes a second body part 521, a rotation prevention unit 522, and a second locking member 523.

The second body part 521 is provided between the elevation unit 300 and the second fastener 400, and is installed in the length direction of the second fastener 400 in a way to be slidingly movable. The second body part 521 according to an embodiment of the present disclosure may be formed to have a hollow cylindrical shape having both ends opened. The outer circumference surface and inner circumference surface of the second body part 521 are disposed to face the inner circumference surface of the elevation member 310 and the outer circumference surface of the second fastening member 410, respectively. A friction reduction member (not illustrated) may be provided or a tolerance having a certain size may be formed between the second body part 521 and the elevation member 310 and the second fastening member 410 so that the second body part 521 may be slidingly moved smoothly in the length direction of the second fastener 400.

The rotation prevention unit 522 is provided in the second body part 521 so that a relative rotation of the second body part 521 with respect to the second fastener 400 is prevented. The rotation prevention unit 522 according to an embodiment of the present disclosure may be exemplified as the inner circumference surface of the second body part 521 that is disposed to face the outer circumference surface of the second fastening member 410. The rotation prevention unit 522 is formed to have a polygonal cross-section shape on a plane parallel to the radial direction of the second body part 521, and is trapped and connected to the outer circumference surface of the second fastening member 410. The rotation prevention unit 522 prevents the second body part 521 from being relatively rotated around the central axis of the second fastening member 410 with respect to the second fastening member 410 by a trapping force with the second fastening member 410. A detailed cross-section shape of the rotation prevention unit 522 may be variously changed in design in a form corresponding to a cross-section shape of the second fastening member 410, in addition to the hexagon illustrated in FIG. 12.

The second locking member 523 is extended from the second body part 521, and is trapped and connected to the first locking unit 510 when the second body part 521 is moved downward by a certain distance or more. More specifically, after the work tool 30 is removed from the case 200, when the second body part 521 is moved downward by a certain distance or more by its own weight, the second locking member 523 is seated on the first body part 511 and trapped and connected to the first locking member 513, and thus restricts the rotation of the second fastener 400.

The second locking member 523 according to an embodiment of the present disclosure includes a sawtooth part 523a.

The sawtooth part 523a protrudes in the radial direction of the second body part 521 from the outer circumference surface of the second body part 521. The sawtooth part 523a has one side formed to have a form of a step that is parallel to the radial direction of the second body part 521, and has the other side formed to have a form of an inclined plane that is slantly disposed at a given angle to the radial direction of the second body part 521. When the second locking member 523 is seated on the first body part 511, the stepped side of the sawtooth part 523a comes into contact with one side of the first locking member 513 of the first locking unit 510, and the sawtooth part 523a restricts the second fastener 400 from being rotated in the direction in which the second fastener 400 is separated from the first fastener 100. FIG. 10 illustrates that one side of the sawtooth part 523a comes into contact with the right side of the first locking member 513, as an example. However, one side of the sawtooth part 523a may come into contact with the left side of the first locking member 513 depending on the direction in which screw threads formed in the second fastener 400 and the first fastener 100 are wound. The sawtooth part 523a is provided in a plural number. The plurality of sawtooth parts 523a is disposed to be spaced apart from each other at certain intervals in the circumferential direction of the second body part 521. The number of sawtooth parts 523a and an interval between the sawtooth parts 523a may be variously changed in design depending on the number of first locking members 513 and an interval between the first locking members 513.

The restoration part 600 restores the elevation unit 300 to an initial location when the second fastener 400 is separated from the first fastener 100. In this case, the initial location of the elevation unit 300 may mean the state in which the elevation unit 300 has descended to the maximum within the case 200 and the bottom of the guide part 320 has been seated on the top of the first locking member 513. Accordingly, the restoration part 600 can secure consistent assembly performance when the first fastener 100 and the second fastener 400 are repeatedly fastened together.

Figure 13:
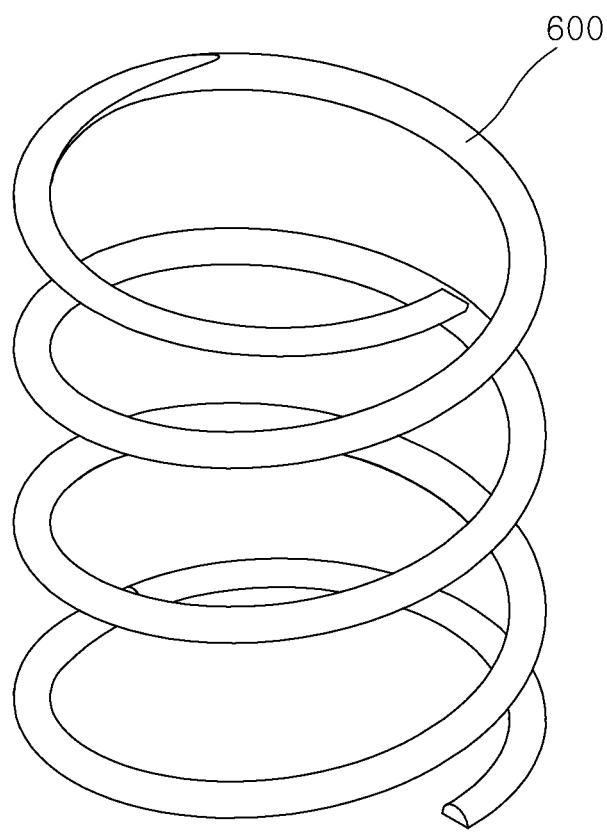
FIG. 13 is a perspective view schematically illustrating a configuration of a restoration part according to an embodiment of the present disclosure.

FIG. 13 is a perspective view schematically illustrating a configuration of the restoration part according to an embodiment of the present disclosure.

Referring to FIGS. 3 and 13, the restoration part 600 according to an embodiment of the present disclosure is installed between the case 200 and the elevation unit 300. The restoration part 600 is formed to have a form of a coil spring that is provided in a stretchable manner in a length direction thereof, and elastically supports the elevation unit 300 with respect to the case 200. The length direction of the restoration part 600 is disposed in parallel to the length direction of the case 200. When the elevation unit 300 is disposed at its initial location, the restoration part 600 may be installed in a neutral state so that an elastic force is not generated in the length direction of the restoration part 600.

Both ends of the restoration part 600 are supported by coming into surface contact with the case 200 and the elevation unit 300, respectively. More specifically, the restoration part 600 has both ends each formed to have a cross section having a semi-circular form. The both ends of the restoration part 600 come into surface contact with the lower side of the top of the case 200 and the top of the guide part 320, respectively. Accordingly, the restoration part 600 can stably maintain a standing state without a special movement between the case 200 and the elevation unit 300 even without separate support means.

Hereinafter, an operation of the fastening apparatus 1 for a vehicle according to an embodiment of the present disclosure is described in detail.

FIGS. 14 to 17 are diagrams schematically illustrating a process of the first fastener and the second fastener being fastened together according to an embodiment of the present disclosure.

Referring to FIGS. 14 to 17, when the first structure 10 is seated on the second structure 20, the first fastener 100 fixed to the first structure 10 is inserted into the case 200 through the insertion hole part 202.

Thereafter, the work tool 30 enters the case 200 through the entry hole 512 provided in the first locking unit 510, and is connected to the bottom of the second fastening member 410.

The work tool 30 connected to the bottom of the second fastening member 410 pushes the second locking member 523 upward in the state in which the top of the work tool 30 has come into contact with the bottom of the second locking member 523.

The second locking member 523 is isolated from the first body part 511 and separated from the first locking member 513 by an external force that is applied by the work tool 30.

The elevation unit 300 is moved upward along with the second locking member 523. The first fastener 100 is inserted into the second fastening member 410 through the top of the second fastening member 410. In this case, as the width of the entry guide part 130 is formed to be reduced toward an end thereof, the first fastener 100 may be smoothly inserted into the second fastening member 410.

Thereafter, the work tool 30 adds, to the second fastening member 410, rotatory power toward one side (e.g., a counterclockwise direction on the basis of FIG. 16) of the second fastening member 410 in the state in which the inner circumference surface of the second fastening member 410 has been engaged with the outer circumference surface of the first fastener 100.

The second fastening member 410 is relatively rotated around the first fastener 100 toward one side thereof, screwed onto the first fastener 100, and moved upward along with the elevation unit 300.

At this time, the restoration part 600 is contracted in the length direction thereof and accumulates an elastic restoring force.

Thereafter, the top of the elevation member 310 comes into contact with the lower side of the top of the case 200. The fastening of the first fastener 100 and the second fastener 400 is completed.

After the fastening of the first fastener 100 and the second fastener 400 is completed, the work tool 30 is separated from the second fastening member 410, and escapes to the outside of the case 200.

The second body part 521 is moved downward separately from the second fastening member 410 by its own weight.

When the second body part 521 is moved downward by a certain distance or more, the bottom of the second locking member 523 is seated on the top of the first body part 511, and the second locking member 523 is trapped and connected to the first locking member 513.

Thereafter, rotatory power may be applied to the second fastening member 410 toward the other side (e.g., a clockwise direction on the basis of FIG. 16) of the second fastening member 410, that is, in the direction in which the second fastener 400 is separated from the first fastener 100 due to vibration occurring while a vehicle drives.

Such rotatory power is offset by the sawtooth part 523$a$ that has one side brought into contact with the first locking member 513. Accordingly, the second fastener 400 can maintain the state in which the second fastener 400 has been fastened to the first fastener 100.

Figure 18:
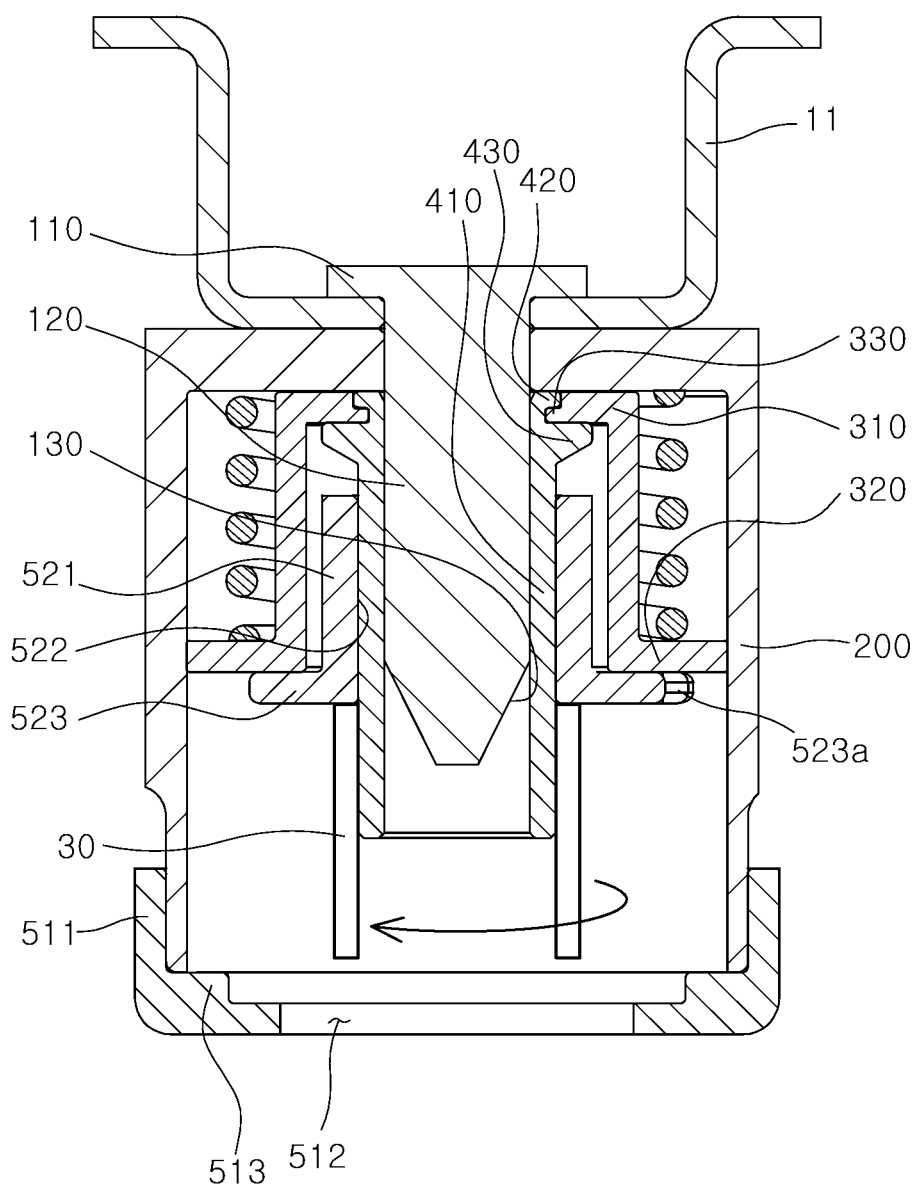
FIGS. 18 and 19 are diagrams schematically illustrating a process of the first fastener and the second fastener being separated from each other according to an embodiment of the present disclosure.
Figure 19:
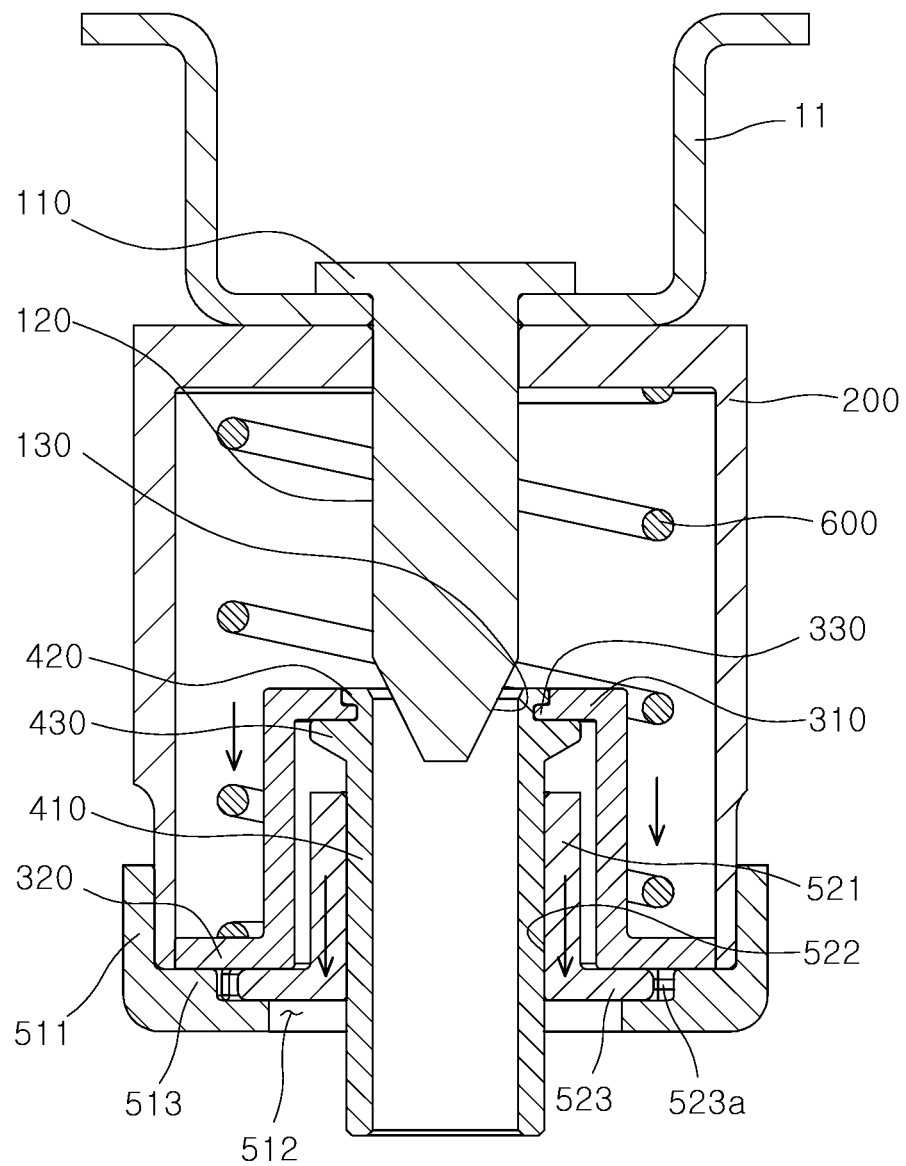

FIGS. 18 and 19 are diagrams schematically illustrating a process of the first fastener and the second fastener being separated from each other according to an embodiment of the present disclosure.

If it is necessary to separate the first fastener 100 and the second fastener 400 from each other due to the replacement of a part, the work tool 30 enters the case 200 through the entry hole 512 provided in the first locking unit 510, and is connected to the bottom of the second fastening member 410.

The work tool 30 connected to the bottom of the second fastening member 410 pushes the second locking member 523 upward in the state in which the top of the work tool 30 has come into contact with the bottom of the second locking member 523.

The second locking member 523 is separated from the first locking member 513 by an external force that is applied by the work tool 30. The state of the second fastening member 410 is changed into the state in which the second fastening member 410 may be rotated toward the other side (e.g., a clockwise direction on the basis of FIG. 18) thereof.

Thereafter, the work tool 30 adds, to the second fastening member 410, rotatory power toward the other side of the second fastening member 410.

The second fastening member 410 is relatively rotated toward the other side thereof with respect to the first fastener 100. The screwing of the second fastening member 410 onto the first fastener 100 is released, and the second fastening member 410 is moved downward along with the elevation unit 300.

When the second fastening member 410 is separated from the first fastener 100, the restoration part 600 is extended in the length direction thereof by an elastic restoring force that has been accumulated in the restoration part 600, and it restores the elevation unit 300 to its initial location and seats the bottom of the second locking member 523 on the top of the first body part 511.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments.

Accordingly, the technical range of protection of the present disclosure should be determined by the claims below.

What is claimed is:

1. A fastening apparatus for a vehicle, comprising:
a first fastener fixed to a first structure;
a case fixed to a second structure and configured to have the first fastener inserted into one side of the case;
an elevation unit installed within the case in a way to be movable up and down;
a second fastener rotatably supported against the elevation unit, fastened to or separated from the first fastener in a rotation direction thereof, and moved up and down along with the elevation unit; and
a locking unit configured to interfere with a work tool that enters another side of the case and to selectively permit a rotation of the second fastener.

2. The fastening apparatus of claim 1, wherein the locking unit comprises:
a first locking unit connected to the another side of the case; and
a second locking unit connected to the second fastener in a way to be movable up and down, fastened to or separated from the first locking unit in a moving direction thereof, and configured to selectively permit the rotation of the second fastener.

3. The fastening apparatus of claim 2, wherein the first locking unit comprises:
a first body part disposed to face the second locking unit;
an entry hole formed to penetrate the first body part and configured to provide guidance to entry of the work tool into the case; and
a first locking member configured to protrude from inside of the first body part toward the entry hole and trapped and connected to the second locking unit when the second locking unit is seated on the first body part.

4. The fastening apparatus of claim 3, wherein:
the first locking member includes a plurality of first locking members, and
the plurality of first locking members are spaced apart from each other at certain intervals in a circumferential direction of the first body part.

5. The fastening apparatus of claim 2, wherein:
when the work tool enters the case, the second locking unit is moved upward and separated from the first locking unit, and
when the work tool escapes from the case, the second locking unit is moved downward and fastened to the first locking unit.

6. The fastening apparatus of claim 5, wherein the second locking unit comprises:
a second body part provided between the elevation unit and the second fastener and installed in a way to be slidingly movable in a length direction of the second fastener;
a rotation prevention unit provided in the second body part so that a relative rotation of the second body part with respect to the second fastener is prevented; and
a second locking member extended from the second body part and connected to the first locking unit when the second body part is moved downward by a certain distance or more.

7. The fastening apparatus of claim 6, wherein the rotation prevention unit is formed to have a polygonal cross-section shape and connected to the second fastener.

8. The fastening apparatus of claim 6, wherein the second locking member comprises a plurality of sawtooth parts configured to protrude in a radial direction of the second body part from an outer circumference surface of the second body part.

9. The fastening apparatus of claim 8, wherein the sawtooth parts come into contact with the first locking unit, and restrict the second fastener from being rotated in a direction in which the second fastener is separated from the first fastener.

10. The fastening apparatus of claim 1, wherein the elevation unit comprises:
an elevation member installed within the case and configured to have the second fastener inserted therein;
a guide part extended from the elevation member and connected to the case in a way to be slidingly movable; and
a support part extended from the elevation member and configured to rotatably support the second fastener.

11. The fastening apparatus of claim 10, wherein the second fastener comprises:
a second fastening member disposed within the elevation member and configured to have a screw thread provided on an inner circumference surface of the second fastening member;
a trapping part extended from the second fastening member and rotatably connected to an one side of the support part; and
a flange extended from the second fastening member and configured to prevent an up and down movement of the second fastening member with respect to the elevation unit by coming into contact with an another side of the support part.

12. The fastening apparatus of claim 11, wherein the second fastening member has a polygonal cross-section shape.

13. The fastening apparatus of claim 1, further comprising: a restoration part configured to restore the elevation unit to an initial location when the second fastener is separated from the first fastener.

14. The fastening apparatus of claim 13, wherein the restoration part is installed between the case and the elevation unit and is provided in a stretchable manner in a length direction of the restoration part.

15. The fastening apparatus of claim 13, wherein both ends of the restoration part in a length direction of the restoration part are supported by coming into surface contact with the case and the elevation unit, respectively.

16. The fastening apparatus of claim 15, wherein each of the both ends of the restoration part has a cross section having a semi-circular form.

* * * * *